Aug. 29, 1950

N. C. CUDDEBACK 2,520,531

SUCTION CLEANER

Filed Dec. 13, 1947

INVENTOR.
*Nelson C. Cuddeback*
BY
*Harry S. Demarest*
ATTORNEY.

Aug. 29, 1950 N. C. CUDDEBACK 2,520,531
SUCTION CLEANER
Filed Dec. 13, 1947 3 Sheets-Sheet 2

INVENTOR.
Nelson C. Cuddeback
BY
Harry S. Ducasse
ATTORNEY.

Aug. 29, 1950   N. C. CUDDEBACK   2,520,531
SUCTION CLEANER

Filed Dec. 13, 1947   3 Sheets-Sheet 3

INVENTOR.
Nelson C. Cuddeback
BY
Harry S. Dumars
ATTORNEY.

Patented Aug. 29, 1950

2,520,531

UNITED STATES PATENT OFFICE 2,520,531

SUCTION CLEANER

Nelson C. Cuddeback, Chicago Heights, Ill., assignor to The Hoover Company, North Canton, Ohio, a corporation of Ohio Application December 13, 1947, Serial No. 791,501

15 Claims. (Cl. 183—54)

This invention relates to suction cleaners of the cylindrical or horizontal tank type and more particularly to a mechanism for shaking the filter to dislodge the dust and dirt therefrom preparatory to its disposal.

According to this invention the filter remains within the cleaner casing at all times and the filter shaker is used to dislodge dust and dirt from the filter while positioned in situ within the cleaner casing. The end cap of the cleaner, covering the filter chamber, is removed, the cleaner body positioned on its end with the filtering chamber facing downwardly. The shaker mechanism is then operated to dislodge the dust and dirt from the filter so that it falls through the open end of the cleaner casing.

The cylindrical or horizontal tank type cleaner usually has a carrying handle near one end of the cleaner body and the filter emptying opening at the opposite end. It is an object of this invention to utilize the carrying handle for operating the filter shaking mechanism and in addition to latch the carrying handle rigidly with respect to the cleaner casing when it is not being used as a filter shaking handle.

Other objects and advantages of this invention will become apparent as the description proceeds when taken in connection with the accompanying drawings in which.

Figure 1:
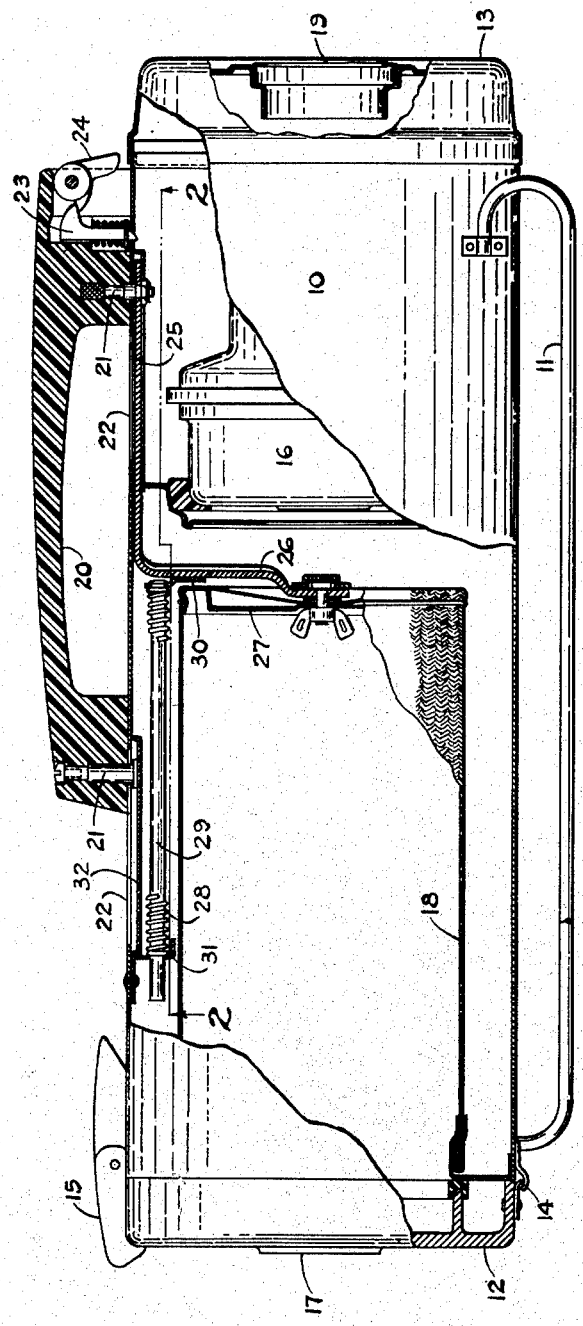
Figure 1 is a plan view of one form of a suction cleaner according to this invention with portions of the walls of the casing broken away to show the details.
Figure 2:
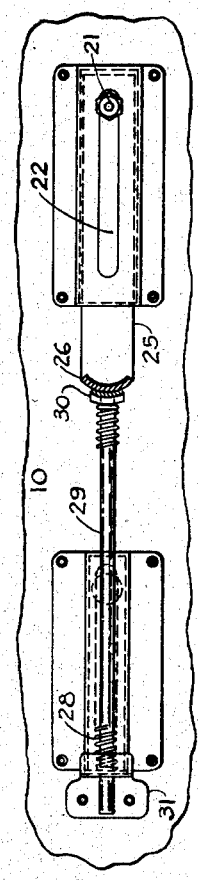
Figure 2 is a detailed view of a portion of the shaker mechanism of Fig. 1 looking in the direction of the arrows of Fig. 1.

Referring to Figs. 1 and 2 of the drawing the reference numeral 10 represents the cleaner casing which is supported on runners 11. The casing 10 has a front end cap 12 and a rear end cap 13. The front end cap is removably held in position by a hook 14 and a clamping latch 15 of any well known construction. A motor fan unit 16 is mounted within the rear end of the casing in any manner well known in the art. The motor fan unit 16 draws air inwardly through an inlet opening 17 in the front of the end cap 12 through a cylindrical filter bag 18 and discharges it through an outlet opening 19 in a manner well known in the art.

Mounted on the top of the casing 10 near the rear end thereof is a carrying handle 20. The handle 20 is mounted for fore and aft reciprocation on the top of the casing 10 by means of bolts or screws 21 passing through slots 22 in the casing 10. The handle 20 is normally held against reciprocating movement relative to the casing 10 by a spring pressed detent 23 adapted to be released by forward movement of the lower end of a detent release lever 24.

The handle 20 is connected to the rear end of the filter 18 by a member 25 attached to the handle 20 by one of the bolts 21 and has a down turned portion 26 which is attached to the central portion of a rigid end member 27 forming the rear end of the filter 18. The member 25 and correspondingly the rear end of the filter 18 is normally biased rearwardly by a spring 28, surrounding a rod 29, attached to the member 25 at 30 and guided for longitudinal reciprocation by the lug 31 extending downwardly from the casing 10 near the front end of the front slot 22.

In order to prevent the escape of air through the front slot 22 a cover plate 32 having a depressed portion to provide for the reciprocation of the head of the front bolt 21 is attached to the inside of the casing 10.

Figure 3:
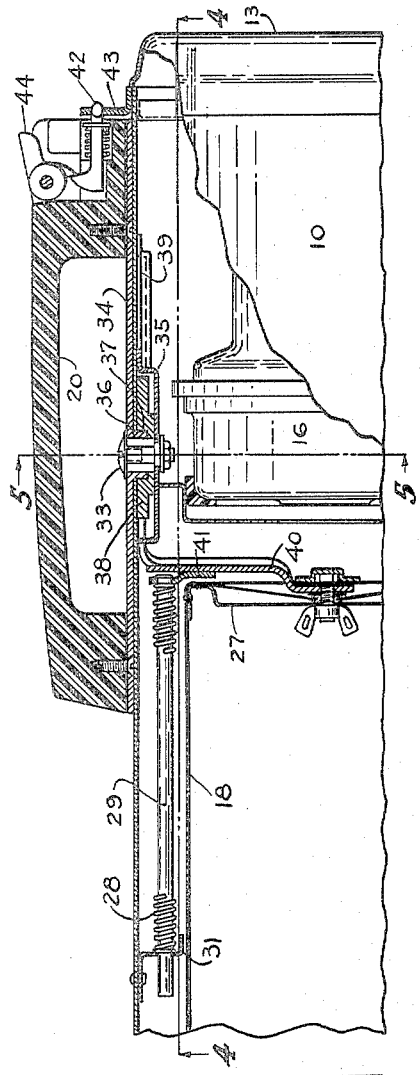
Figure 3 is a partial plan view of another form of the invention with the walls of the casing broken away to show the details.
Figure 4:
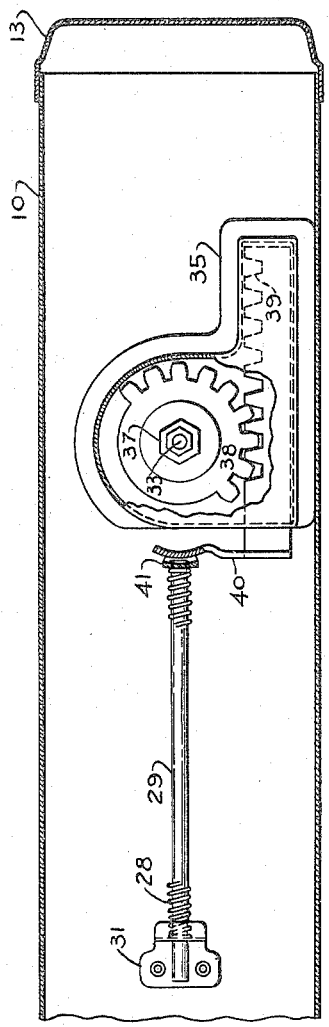
Figure 4 is a detailed view of a portion of the shaker mechanism of Fig. 3 looking in the direction of the arrows of Fig. 3.
Figure 5:
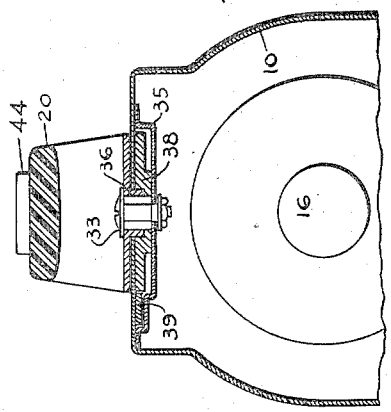
Figure 5 is a cross-sectional view through the mounting means of the handle of Fig. 3.

A second modification is shown in Figs. 3 to 5, inclusive. Where the parts are the same they have been given the same reference characters as in the modification of Figs. 1 and 2.

The handle 20 of this modification is mounted on the top of the casing 10 for oscillatory rotation by a bolt 33 which passes through a plate 34 attached to the handle 20 and through a cover plate 35 inside of the casing 10. The plate 34 has a downwardly extending hexagonal portion 36 extending through the casing 10 and interfitting with a hexagonal depression 37 in a segmental pinion 38 positioned on the inside of the casing 10 between the casing and the cover plate 35. The teeth of the segmental pinion 38 intermesh with the teeth on a reciprocating member 39 having a downward extension 40 attached centrally to the rigid end 27 of the filter 18. The rod 29 is attached to the downwardly extending portion 46 of the rack bar 39 as at 41.

The arrangement is such that the spring 28 normally holds the handle 20 in the position shown in Fig. 3 and it is held in that position by a spring detent 42 cooperating with an apertured lug 43 extending upwardly from the casing 10. The detent 42 is adapted to be released by downward movement of the free end of the detent release lever 44.

Figure 6:
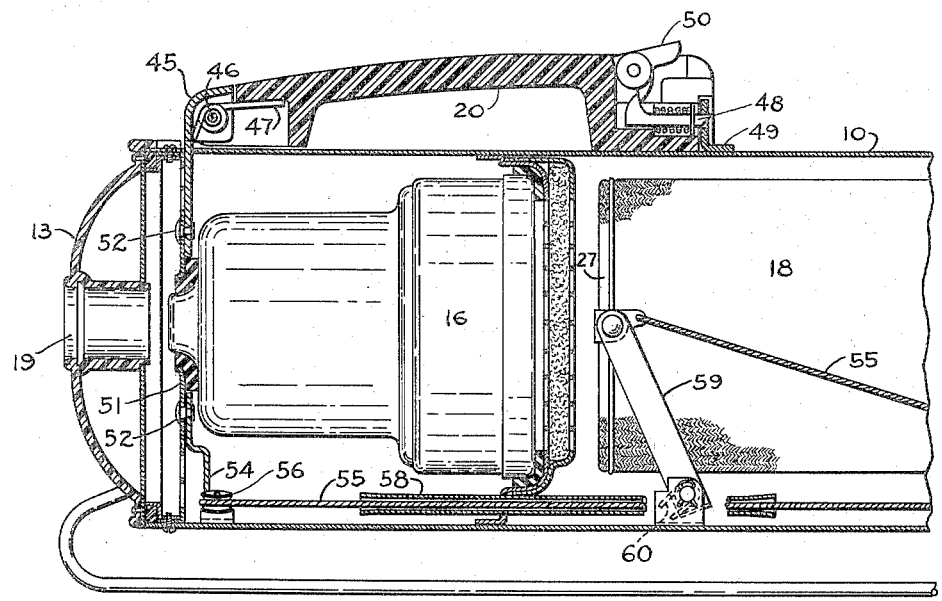
Figure 6 is a cross-sectional view taken longitudinally through a portion of another form of the invention.
Figure 7:
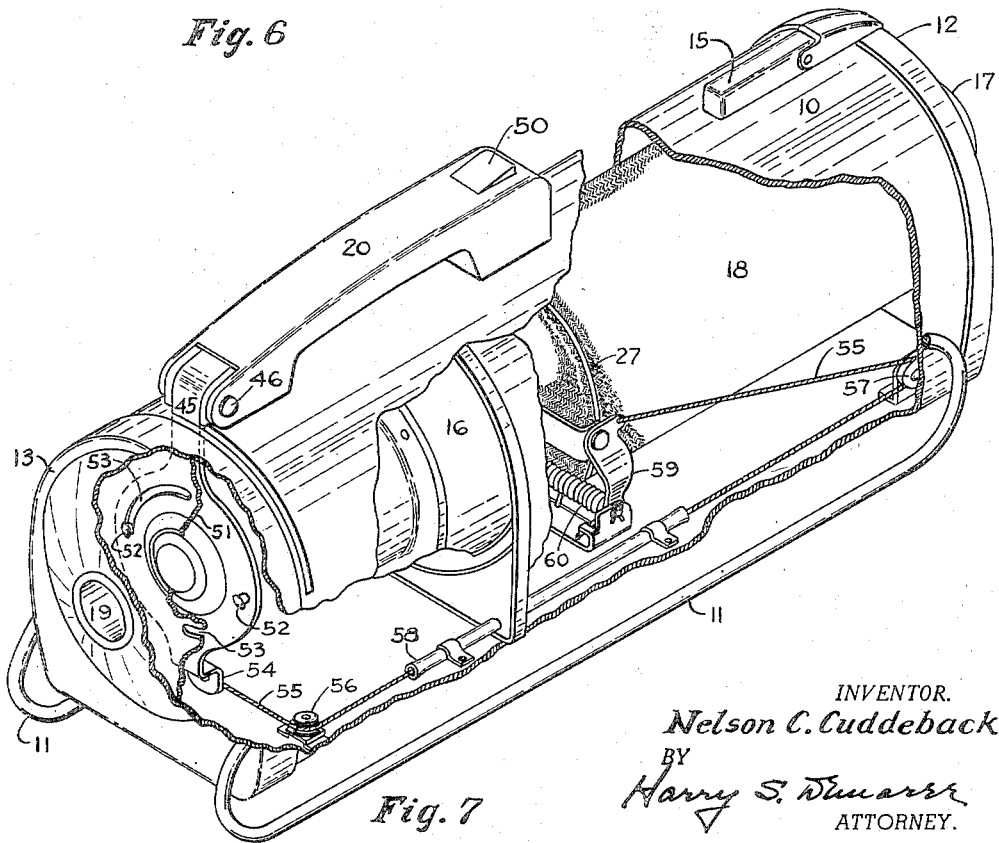
Figure 7 is a perspective view of the modification of Fig. 6 with the walls of the casing broken away to show the details of construction.

In the modification of Figs. 6 and 7 the handle 20 is pivoted to a member 45 at the rear end of the casing 10 on a horizontal axis 46, is spring-biased to counter-clockwise position by the spring 47 and is normally held in clockwise position by the spring pressed detent 48 coacting with an apertured lug 49 secured to the top of the casing 10. The handle 20 is adapted to be released for upward movement under the bias of the spring 47 by depression of a detent release lever 50 pivoted to the forward end of the handle 20.

The member 45 is mounted for oscillation about the axis of casing 10 on a bulkhead 51, by pins 52 carried by the member 45 and extending through arcuate slots 53 in the bulkhead 51.

Attached to a downwardly extending lug 54 on the member 45 is the end of cable 55, guided for oscillating movement by the rollers 56 and 57 and the guide tube 58. The other end of the cable 55 is attached to the upper end of a pivotally oscillating link 59 attached to the end 27 of the filter 18 in any suitable manner such as that shown in Fig. 7. The link 59 is spring-biased counter-clockwise by a spring 60.

Operation

In all three modifications, when it is desired to clean the filter 18, the front end cap 12 is removed by operation of the latch 15, and the cleaner is upended upon a newspaper or a receptacle to receive the dirt which has accumulated within the filter chamber.

In the modification of Fig. 1 the detent release lever 24 is depressed to remove the end of the detent pin from the aperture in the casing 10. The handle 20 is then moved forwardly against the bias of the spring 28 which will collapse the filter 18 by movement of its end 27 forwardly. The handle 20 is then released whereby the spring 28 will suddenly return the end 27 of the filter 18 to its original position thereby snapping the filtering material into a taut condition so as to loosen dust and dirt embedded therein. The dislodged dirt will fall downwardly through the open end of the filter chamber for later disposal. This operation may be continued for any number of times until the filter 18 is thoroughly cleansed of dust and dirt.

In the modification of Figs. 3 to 5, inclusive, the detent release lever 44 is depressed and the handle 20 rotated through approximately 180 degrees which will compress the spring 28 and collapse the filter 18 in the same manner as in the modification of Fig. 1. The handle 20 is then released whereby the spring 28 will snap the filter to its taut position and dislodge the dust and dirt from the filter 18 in the same manner as in the modification of Fig. 1. This operation may be continued for any number of times until the filter is thoroughly cleansed of dust and dirt.

In the modification of Figs. 6 and 7 the detent release lever 50 is depressed whereby the spring 47 will move the handle 20 about the pivot 46 into a vertical position. The handle 20 is then moved clockwise as viewed in Fig. 7 whereby the pins 52 will move to the opposite ends of the slots 53. This will move the lower end 54 of the member 45 to the left as viewed in Fig. 7 and pull the cable 55 forwardly over the guide pulleys 56 and 57 and through the guide tube 58. The link 59 will also be moved clockwise against the bias of the spring 60 and collapse the filter 18. The handle 20 is then released whereby the spring 60 will snap the filter 18 to its taut position to dislodge dust and dirt therefrom in the same manner as in the other modifications.

This operation may be continued for any number of times until the filter 18 is thoroughly cleansed of dust and dirt after which the handle 20 is moved clockwise against the bias of the spring 47 and latched in its horizontal position by the detent 48.

While I have shown but three modifications of this invention it is to be understood that these modifications are to be taken as illustrative only and not in a limiting sense. I do not wish to be limited to the particular structure shown and described but to include all equivalent variations thereof except as limited by the scope of the claims.

I claim:
1. A suction cleaner comprising a normally horizontal casing having a filter chamber, a closed end dirt storing filter horizontally positioned in said chamber, spring means connected with the closed end of said filter for normally biasing said filter to a taut or stretched position as it performs its filtering function, a carrying handle movably mounted on said casing, means for latching said carrying handle in its normal carrying position, means for releasing said carrying handle for movement away from its normal carrying position, and means connected with said spring means and actuated by movement of said carrying handle away from its normal carrying position for collapsing said filter against the bias of said spring means whereby upon release of said carrying handle said filter will be snapped back to its taut position by said spring means so as to dislodge dust and dirt therefrom.

2. A suction cleaner according to claim 1 in which said carrying handle is mounted for reciprocatory movement relative to said casing.

3. A suction cleaner according to claim 1 in which said carrying handle is mounted for pivotal movement relative to said casing.

4. A suction cleaner according to claim 1 in which said carrying handle is mounted for pivotal movement transversely of said casing and then for oscillatory movement about the axis of said casing to move said filter to its collapsed position.

5. A suction cleaner including a normally horizontal casing having a filter chamber, a closed end dirt storing filter horizontally positioned in said chamber, a filter shaker connected to the closed end of said filter for dislodging dust and dirt from said filter, a carrying handle movably mounted on said casing, means connected with said filter shaker and actuated by movement of said carrying handle from its normal carrying position for operating said filter shaker and manually releasable means for latching said handle in its normal carrying position.

6. A suction cleaner according to claim 5 in which said carrying handle is mounted on said casing for reciprocatory movement in operating said filter shaker.

7. A suction cleaner according to claim 5 in which pivotal movement of said carrying handle from its carrying position operates said filter shaker.

8. A suction cleaner according to claim 5 in which oscillatory movement of said carrying handle from its carrying position operates said filter shaker.

9. A suction cleaner according to claim 5 in which the release of said latching means releases said carrying handle for pivotal movement transversely of said casing and oscillatory movement of said handle about the axis of said casing operates said filter shaker.

10. A suction cleaner including a normally horizontal casing having a filter chamber, a flexible closed end dirt storing filter horizontally positioned in said chamber, means connected with the closed end of said filter for biasing said filter to a taut position, a normally stationary carrying handle attached to said casing, manually actuatable means for releasing said handle for movement to a non-carrying position, and means connected with said biasing means and actuated by movement of said carrying handle to its non-carrying position for moving said filter to a collapsed position and said biasing means acting to return said handle to its normal carrying position upon release of said carrying handle and for returning said filter to its taut position so as to dislodge dust and dirt therefrom.

11. A suction cleaner comprising a casing normally positioned horizontally when in use, a filter chamber in one end of said casing, a removable end cap for said filter chamber, a carrying handle at the opposite end of said casing, said carrying handle being mounted for reciprocatory movement relative to said casing, a flexible cylindrical filter in said filter chamber, one end of said filter being secured to said casing adjacent said end cap, means for connecting the other end of said filter to said carrying handle, spring means for normally biasing said carrying handle to its carrying position and means for latching said carrying handle in its carrying position, the arrangement being such that movement of said carrying handle from its carrying position tensions said spring means and collapses said filter whereby upon release of said carrying handle for return movement to its carrying position said spring means snaps said filter to its taut position to dislodge dust and dirt therefrom.

12. A suction cleaner comprising a casing normally positioned horizontally when in use, a filter chamber in one end of said casing, a removable end cap for said filter chamber, a carrying handle at the opposite ends of said casing, said carrying handle being mounted on said casing for pivotal movement on a vertical axis, means for latching said handle in carrying position, spring means for biasing said handle to carrying position when moved therefrom, a flexible cylindrical filter in said casing, one end of said filter being secured to the interior of said casing adjacent said end cap, means connected to the other end of said filter and operated by movement of said carrying handle away from its carrying position for collapsing said filter, the arrangement being such that release of said carrying handle for return to its carrying position under the bias of said spring means snaps said filter to its taut position to dislodge dust and dirt therefrom.

13. A suction cleaner comprising a casing normally positioned horizontally when in use, a filter chamber in one end of said casing, a removable end cap for said filter chamber, a flexible cylindrical filter in said filter chamber, one end of said filter being secured to the interior of said casing adjacent said end cap, means attached to the other end of said filter for spring biasing said filter to a taut position, a carrying handle mounted on the other end of said casing for oscillatory movement about the axis of said casing and means actuated by oscillatory movement of said carrying handle from its carrying position for collapsing said filter against the bias of said spring biasing means, the arrangement being such that upon release of said carrying handle for return movement toward its carrying position said spring means snaps said filter to its taut position to dislodge dust and dirt therefrom.

14. A suction cleaner comprising, a casing, means for supporting said casing in a horizontal position, a suction end cap detachably secured to one end of said casing, said end cap having a suction opening substantially centrally thereof for detachably receiving one end of a suction hose, a motor fan unit supported in the other end of said casing and arranged to draw air through said suction opening, a substantially cylindrical closed end filter having its open end secured to said casing adjacent said detachable end cap arranged to have dirt laden air drawn therethrough by the operation of said motor fan unit whereby dirt separated from the air is deposited in said filter, a movable filter support secured to the closed end of said filter centrally thereof, spring means for biasing said support to hold said filter in a taut condition, a movable carrying handle attached to the upper wall of said casing adjacent the end thereof opposite said suction end cap whereby said casing may be upended for emptying dirt stored in said filter upon removal of said end cap, means for connecting said handle to said filter support in such manner that movement of said handle from its carrying position will move said filter support against the bias of said spring means to move the closed end of said filter toward its open end and upon release of said handle said spring means will snap said filter back to its taut condition to shake dirt loose therefrom and manually releasable means for positively locking said handle in its carrying position against movement to its filter collapsing position to prevent unintentional shaking of said filter.

15. A suction cleaner comprising, a casing, means for supporting said casing in a horizontal position, a suction end cap detachably secured to one end of said casing, said end cap having a suction opening substantially centrally thereof for detachably receiving one end of a suction hose, a motor fan unit supported in the other end of said casing and arranged to draw air through said suction opening, a substantially cylindrical closed end filter having its open end secured to said casing adjacent said suction end cap arranged to have dirt laden air drawn therethrough by the operation of said motor fan unit whereby dirt separated from the air is deposited in said filter, a movable filter support secured to the closed end of said filter centrally thereof, means for attaching said filter support to the interior of said casing for reciprocatory movement, spring means for biasing said filter support so as to hold said filter in a taut condition, a movable carrying handle attached to the upper wall of said casing near the end opposite said suction end cap whereby said casing can be upended for emptying said filter upon removal of said end cap, said handle being mounted for reciprocatory movement and attached to said filter support for reciprocatory movement therewith and manually releasable means for positively locking said handle in its carrying position against movement to its filter collapsing position to prevent unitentional shaking of said filter.

NELSON C. CUDDEBACK.

REFERENCES CITED

The following references are of record in the file of this patent:

UNITED STATES PATENTS

| Number | Name | Date |
|---|---|---|
| 2,077,572 | Lofgren | Apr. 20, 1937 |
| 2,192,357 | Leathers | Mar. 5, 1940 |
| 2,414,564 | Silverman et al. | Jan. 21, 1947 |